United States Patent
Wakimoto et al.

(10) Patent No.: US 10,811,650 B2
(45) Date of Patent: Oct. 20, 2020

(54) SECONDARY BATTERY (71) Applicant: SANYO Electric Co., Ltd., Daito-shi, Osaka (JP)

(72) Inventors: Ryoichi Wakimoto, Hyogo (JP); Hiroyuki Yamada, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 112 days.

(21) Appl. No.: 16/312,395

(22) PCT Filed: Jun. 27, 2017

(86) PCT No.: PCT/JP2017/023469
§ 371 (c)(1),
(2) Date: Dec. 21, 2018

(87) PCT Pub. No.: WO2018/003761
PCT Pub. Date: Jan. 4, 2018

(65) Prior Publication Data
US 2019/0237728 A1 Aug. 1, 2019

(30) Foreign Application Priority Data
Jun. 29, 2016 (JP) ................. 2016-128239

(51) Int. Cl.
*H01M 2/12* (2006.01)
*H01M 2/02* (2006.01)
(Continued)

(52) U.S. Cl.
CPC .......... *H01M 2/1241* (2013.01); *H01M 2/02* (2013.01); *H01M 2/04* (2013.01); *H01M 2/06* (2013.01);
(Continued)

(58) Field of Classification Search
CPC ...... H01M 2/1241; H01M 2/345; H01M 2/12; H01M 2/06; H01M 2/30; H01M 2/1229;
(Continued)

(56) References Cited

U.S. PATENT DOCUMENTS

2010/0279156 A1 11/2010 Kim et al.
2012/0196162 A1* 8/2012 Shiraishi ............ H01M 2/1241
429/56
(Continued)

FOREIGN PATENT DOCUMENTS

JP 2000-260410 A 9/2000
JP 2004-30946 A 1/2004
(Continued)

OTHER PUBLICATIONS

International Search Report dated Aug. 22, 2017, issued in counterpart application No. PCT/JP2017/023469 (2 pages).

*Primary Examiner* — Stephen J Yanchuk
(74) *Attorney, Agent, or Firm* — Westerman, Hattori, Daniels & Adrian (57) ABSTRACT

A secondary battery includes: an electrode assembly including a positive electrode plate and a negative electrode plate; an exterior housing that has an opening and houses the electrode assembly; and a sealing plate (2) that seals the opening. The exterior housing and the sealing plate (2) form a battery case. A deformable member (19) that deforms when the pressure inside the battery case reaches a prescribed value or higher and a gas release valve (18) that breaks when the pressure inside the battery case reaches a prescribed value or higher to release gas inside the battery case to the outside of the battery case are provided in the sealing plate (2). A metallic reinforcing member (30) is connected to the inner surface of the sealing plate (2).

6 Claims, 9 Drawing Sheets (51) Int. Cl.
*H01M 10/04* (2006.01)
*H01M 2/34* (2006.01)
*H01M 2/06* (2006.01)
*H01M 2/04* (2006.01)
*H01M 2/30* (2006.01)

(52) U.S. Cl.
CPC .............. *H01M 2/12* (2013.01); *H01M 2/30* (2013.01); *H01M 2/34* (2013.01); *H01M 2/345* (2013.01); *H01M 10/04* (2013.01); *H01M 2200/20* (2013.01)

(58) Field of Classification Search
CPC ........ H01M 2/02; H01M 2/1211; H01M 2/34; H01M 2/024; H01M 2/04; H01M 2/0473; H01M 10/04; H01M 2220/20; H01M 2220/00
See application file for complete search history.

(56) References Cited

U.S. PATENT DOCUMENTS

| | | | |
|---|---|---|---|
| 2014/0127538 A1* | 5/2014 | Uruno | H01M 2/12 429/53 |
| 2015/0140372 A1 | 5/2015 | Kondo | |
| 2015/0333300 A1 | 11/2015 | Kim | |
| 2016/0133900 A1 | 5/2016 | Li et al. | |
| 2016/0133901 A1 | 5/2016 | Li et al. | |
| 2017/0373302 A1* | 12/2017 | Hirose | H01G 11/16 |
| 2019/0115163 A1* | 4/2019 | Yamashita | H01G 11/74 |

FOREIGN PATENT DOCUMENTS

| | | |
|---|---|---|
| JP | 2005-267945 A | 9/2005 |
| JP | 2011-18645 A | 1/2011 |
| JP | 2015-99747 A | 5/2015 |
| JP | 2015-106490 A | 6/2015 |
| JP | 2015-220229 A | 12/2015 |
| JP | 2016-96129 A | 5/2016 |

* cited by examiner

SECONDARY BATTERY

TECHNICAL FIELD

The present invention relates to a secondary battery.

BACKGROUND ART

Hybrid electric vehicles and electric vehicles that use secondary batteries such as non-aqueous electrolyte secondary batteries have come into widespread use. In hybrid electric vehicles and electric vehicles, a plurality of secondary batteries are connected in series or parallel and used as an assembled battery.

It is necessary for these secondary batteries to have high reliability, and a safety mechanism is provided for the secondary batteries. For example, a gas release valve is provided in a battery case. The gas release valve breaks when the pressure inside the battery case reaches a prescribed value or higher to release the gas inside the battery case to the outside of the battery case.

One technique proposed to improve the reliability of a secondary battery when it is overcharged is to provide a short circuit mechanism that is activated when the pressure inside the battery case reaches a prescribed value or higher and causes positive and negative electrodes to be electrically short-circuited outside an electrode assembly (PTL 1 below).

CITATION LIST

Patent Literature

PTL 1: Japanese Published Unexamined Patent Application No. 2011-018645

SUMMARY OF INVENTION

Technical Problem

One object of the present invention is to provide a more reliable secondary battery.

Solution to Problem

A secondary battery according to one aspect of the present invention includes:

an electrode assembly including a positive electrode plate and a negative electrode plate;

an exterior housing that has an opening and houses the electrode assembly; and a sealing plate that seals the opening, wherein the exterior housing and the sealing plate form a battery case, wherein a deformable member that deforms when the pressure inside the battery case reaches a prescribed value or higher and a gas release valve that breaks when the pressure inside the battery case reaches a prescribed value or higher to release gas inside the battery case to the outside of the battery case are provided in the sealing plate, wherein a metallic reinforcing member is connected to the inner surface of the sealing plate, and wherein the reinforcing member is positioned so as to face the gas release valve.

To improve the reliability of a secondary battery, it is contemplated to provide a gas release valve for a sealing plate included in a battery case and to provide, for the sealing plate, a deformable member such as an invertible plate forming, for example, a short circuit mechanism that is activated when the pressure inside the battery case reaches a prescribed value or higher. In this case, the gas release valve and the deformable member are each formed to have a smaller thickness than the main body of the sealing plate. Therefore, when the gas release valve and the deformable member are disposed in the sealing plate, the strength of the sealing plate is lower than that when only the gas release valve is disposed in the sealing plate and the deformable member is not disposed in the sealing plate. When the pressure inside the battery case increases, the sealing plate may deform. In this case, the pressure at which the deformable member is activated and the pressure at which the gas release valve is activated may deviate from their intended values.

In the secondary battery having the structure described above, the gas release valve and the deformable member disposed in the sealing plate can cause a reduction in the strength of the sealing plate. However, since the metallic reinforcing member is connected to the inner surface of the sealing plate, the deformation such as bending of the sealing plate caused by an increase in the pressure inside the battery case can be reduced. Therefore, the activation pressure of the deformable member and the activation pressure of the gas release valve can be stabilized. This allows the secondary battery to be more reliable.

Advantageous Effects of Invention

The present invention can provide a highly reliable secondary battery.

DESCRIPTION OF EMBODIMENTS

Embodiments of the present invention will be described in detail with reference to the drawings. However, the present invention is not limited to the following embodiments.

Figure 1A:
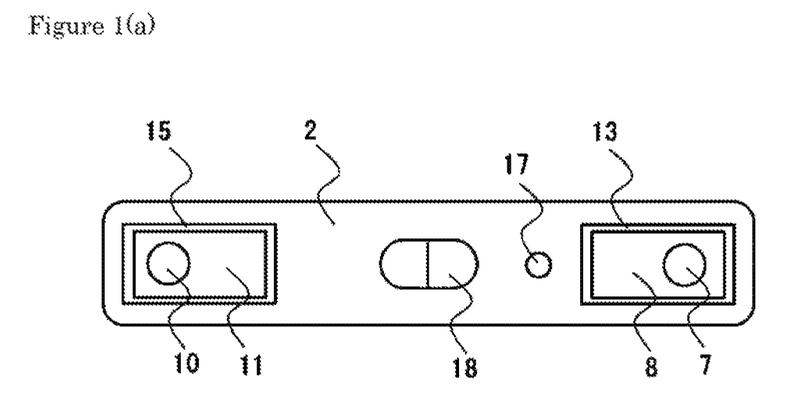
FIG. 1(a) is a top view schematically showing the structure of a secondary battery in one embodiment of the present invention.
Figure 1B:
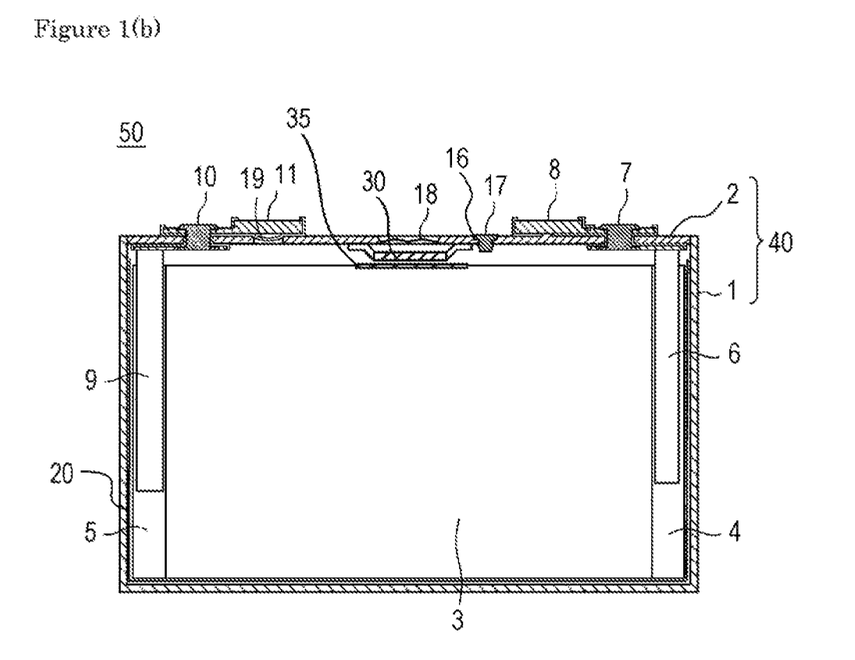
FIG. 1(b) is a cross-sectional view of the secondary battery.

As shown in FIGS. 1(a) and 1(b), in a rectangular secondary battery 50 in an embodiment, an electrode assembly 3 serving as a power generation element and an electrolytic solution are housed in a battery case 40. The electrode assembly 3 has a structure in which a positive electrode plate (not shown) and a negative electrode plate (not shown) are wound or stacked with a separator (not shown) therebetween. The electrode assembly 3 shown in FIG. 1(b) is a wound electrode assembly including the long positive electrode plate and the long negative electrode plate that are wound with the separator therebetween. A wound positive electrode core-exposed portion 4 is formed at one end of the electrode assembly 3, and a wound negative electrode core-exposed portion 5 is formed at the other end.

The battery case 40 includes: an exterior housing 1 that has an opening and houses the electrode assembly 3; and a sealing plate 2 that seals the opening of the exterior housing 1. The exterior housing 1 has a closed-end rectangular cylindrical shape with an upper opening. Preferably, the exterior housing 1 and the sealing plate 2 are made of a metal. Preferably, they are each made of aluminum, an aluminum alloy, stainless steel, iron, an iron alloy, etc. An insulating sheet 20 is disposed between the exterior housing 1 and the electrode assembly 3.

The positive electrode plate used may be prepared by forming a positive electrode active material layer containing a positive electrode active material on a surface of a metallic positive electrode core. The negative electrode plate used may be prepared by forming a negative electrode active material layer containing a negative electrode active material on a surface of a metallic negative electrode core. The positive electrode plate and the negative electrode plate have the positive electrode core-exposed portion 4 with no active electrode layer at its end and the negative electrode core-exposed portion 5 with no active electrode layer at its end, respectively. The positive electrode plate and the negative electrode plate are disposed such that the positive electrode core-exposed portion 4 and the negative electrode core-exposed portion 5 extend in opposite directions. The positive electrode core-exposed portion 4 is connected to a positive electrode terminal 7 through a positive electrode current collector 6. The negative electrode core-exposed portion 5 is connected to a negative electrode terminal 10 through a negative electrode current collector 9. The positive electrode terminal 7 and the negative electrode terminal 10 pass through their respective through holes formed in the sealing plate 2 and are fixed to the sealing plate 2. On the outer surface side of the sealing plate 2, the positive electrode terminal 7 is connected to a positive electrode external conductive member 8, and the negative electrode terminal 10 is connected to a negative electrode external conductive member 11.

A liquid injection hole 16 for injecting the electrolytic solution is formed in the sealing plate 2. The liquid injection hole 16 is sealed with a sealing member 17 after injection of the electrolytic solution. A gas release valve 18 is disposed in the sealing plate 2. The gas release valve 18 breaks when the pressure inside the battery case 40 reaches a prescribed value or higher to thereby release the gas inside the battery case 40 to the outside of the battery case 40.

A deformable member 19 is disposed in the sealing plate 2. The deformable member 19 deforms when the pressure inside the battery case 40 reaches a prescribed value or higher and comes into contact with the negative electrode external conductive member 11 directly or through another conductive member. Preferably, the pressure at which the gas release valve 18 breaks is set to be higher than the pressure at which the deformable member 19 deforms. The thickness of the gas release valve 18 and the thickness of the deformable member 19 are smaller than the thickness of the sealing plate 2. The gas release valve 18 is formed as a thin-walled portion by subjecting the sealing plate 2 to press working. The deformable member 19 is connected by welding to the outer surface side of the sealing plate 2 so as to cover a through hole 2x formed in the sealing plate 2. A gas release valve separate from the sealing plate 2 may be connected by welding to the sealing plate 2 so as to cover the through hole formed in the sealing plate 2. Preferably, a groove is formed in the gas release valve.

When the rectangular secondary battery 50 is a non-aqueous electrolyte secondary battery, it is preferable that the positive electrode core, the positive electrode current collector 6, the positive electrode terminal 7, and the positive electrode external conductive member 8 are each made of aluminum or an aluminum alloy. It is preferable that the negative electrode core, the negative electrode current collector 9, and the negative electrode terminal 10 are each made of copper or a copper alloy. One part of the negative electrode terminal 10 may be made of copper or a copper alloy, and the other part may be made of aluminum or an aluminum alloy. The part made of copper or a copper alloy may be disposed inside the battery case 40. In this case, it is preferable that the negative electrode external conductive member 11 is made of aluminum or an aluminum alloy. The negative electrode terminal 10 may be made of copper or a copper alloy. In the negative electrode external conductive member 11, a portion connected to the negative electrode terminal 10 may be made of copper or a copper alloy. In this case, it is preferable that, in the negative electrode external conductive member 11, a portion to which a bus bar is connected is made of aluminum or an aluminum alloy. It is also preferable that bus bars connecting terminals of adjacent secondary batteries are made of aluminum or an aluminum alloy.

Figure 2:
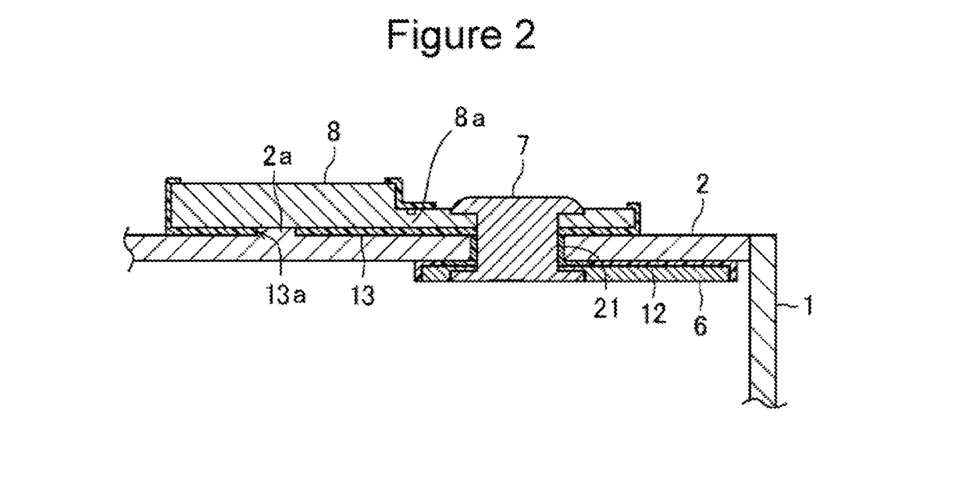
FIG. 2 is a partial enlarged cross-sectional view around a positive electrode terminal of the secondary battery shown in FIG. 1(b).

As shown in FIG. 2, the positive electrode terminal 7 passes through a through hole formed in the sealing plate 2 and is fixed to the sealing plate 2. A gap between the positive electrode terminal 7 and the sealing plate 2 is hermetically sealed with a gasket 21 disposed on the inner surface of the through hole. The positive electrode terminal 7 is connected to the positive electrode current collector 6 on the inner surface side of the sealing plate 2. The positive electrode terminal 7 is connected to the positive electrode external conductive member 8 on the outer surface side of the sealing plate 2. A first insulating member 12 is disposed between the sealing plate 2 and the positive electrode current collector 6. A second insulating member 13 is disposed between the sealing plate 2 and the positive electrode external conductive member 8. The second insulating member 13 has a through hole 13a, and a first protrusion 2a of the sealing plate 2 is disposed in the through hole 13a. The sealing plate 2 and the positive electrode external conductive member 8 are electrically connected to each other through the first protrusion 2a. The second insulating member 13 may not be used, and the positive electrode external conductive member 8 may be disposed directly on the sealing plate 2. Instead of the second insulating member 13, a conductive member may be disposed between the sealing plate 2 and the positive electrode external conductive member 8. The gasket 21 and one of the first insulating member 12 and the second insulating member 13 may be formed as a single component. Preferably, the gasket 21, the first insulating member 12, and the second insulating member 13 are each made of a resin.

The positive electrode terminal 7 is connected by, for example, welding to the positive electrode current collector 6 on the inner surface side of the sealing plate 2 and is connected by crimping to the positive electrode external conductive member 8 on the outer surface side of the sealing plate 2. Preferably, the crimped portion of the positive electrode terminal 7 is connected by welding to the positive electrode external conductive member 8. The positive electrode terminal 7 may be connected by crimping to the positive electrode current collector 6 on the inner surface side of the sealing plate 2. The positive electrode external conductive member 8 may not be used, and a flange portion may be provided in the positive electrode terminal 7. This flange portion is disposed on the outer surface side of the sealing plate 2.

When an assembled battery is produced by connecting a plurality of the rectangular secondary batteries 50 through bus bars, each bus bar may be connected to the positive electrode external conductive member 8 of a secondary battery 50 at a position spaced apart from the portion connected to the positive electrode terminal 7 toward the center of the sealing plate 2. Preferably, the positive electrode external conductive member 8 and the bus bar are each made of aluminum or an aluminum alloy. An opening or a notch may be formed in the positive electrode external conductive member 8 to form a fuse portion 8a. In this case, it is preferable that the fuse portion is formed in the positive electrode external conductive member 8 at a position between the portion connected to the positive electrode terminal 7 and the portion connected to the bus bar. A fuse portion may be provided in the positive electrode current collector 6. The fuse portions are not essential components.

Figure 3:
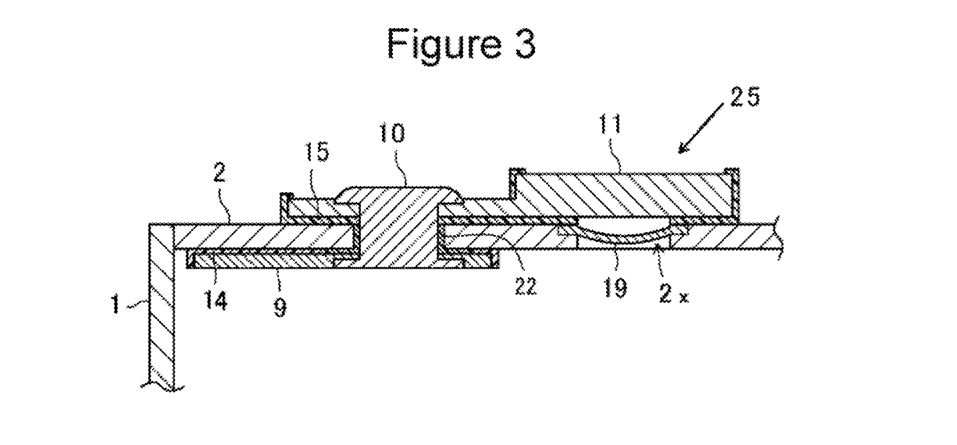
FIG. 3 is a partial enlarged cross-sectional view around a negative electrode terminal of the secondary battery shown in FIG. 1(b).

As shown in FIG. 3, the negative electrode terminal 10 passes through a through hole formed in the sealing plate 2 and is fixed to the sealing plate 2. A gap between the negative electrode terminal 10 and the sealing plate 2 is hermetically sealed with a gasket 22. The negative electrode terminal 10 is connected to the negative electrode current collector 9 on the inner surface side of the sealing plate 2. The negative electrode terminal 10 is connected to the negative electrode external conductive member 11 on the outer surface side of the sealing plate 2. A third insulating member 14 is disposed between the sealing plate 2 and the negative electrode current collector 9. A fourth insulating member 15 is disposed between the sealing plate 2 and the negative electrode external conductive member 11.

The negative electrode terminal 10 is connected by, for example, welding to the negative electrode current collector 9 on the inner surface side of the sealing plate 2 and is connected by crimping to the negative electrode external conductive member 11 on the outer surface side of the sealing plate 2. Preferably, the crimped portion of the negative electrode terminal 10 is connected by welding to the negative electrode external conductive member 11. The negative electrode terminal 10 may be connected by crimping to the negative electrode current collector 9 on the inner surface side of the sealing plate 2. The negative electrode external conductive member 11 may not be used, and a flange portion may be provided in the negative electrode terminal 10. This flange portion is disposed on the outer surface side of the sealing plate 2. The gasket 22 and one of the third insulating member 14 and the fourth insulating member 15 may be formed as a single component. Preferably, the gasket 22, the third insulating member 14, and the fourth insulating member 15 are each made of a resin.

As shown in FIG. 3, the through hole 2x is formed in the sealing plate 2, and the deformable member 19 is disposed so as to cover the through hole 2x. The peripheral edge of the deformable member 19 is connected by welding to the sealing plate 2. Preferably, the deformable member 19 has a dome portion with its central part protruding toward the inner side of the battery (toward the electrode assembly 3). Preferably, when the pressure inside the battery case 40 reaches a prescribed value or higher, the dome portion deforms so as to protrude toward the outer side of the battery (toward the negative electrode external conductive member 11).

When the rectangular secondary battery 50 is, for example, overcharged, gas may be generated in the battery case 40. In this case, when the pressure inside the battery case 40 exceeds a prescribed value, the deformable member 19 deforms so as to protrude toward the negative electrode external conductive member 11. Then the deformable member 19 comes into contact with the negative electrode external conductive member 11. Since the sealing plate 2 is electrically connected to the positive electrode external conductive member 8 as described above, the deformable member 19 is electrically connected to the positive electrode plate. Therefore, when the deformable member 19 deforms and comes into contact with the negative electrode external conductive member 11, the positive electrode plate and the negative electrode plate are electrically short-circuited outside the electrode assembly 3. The deformable member 19 and the negative electrode external conductive member 11 form a short circuit mechanism 25.

This can prevent further charging current from flowing into the electrode assembly 3, and energy in the electrode assembly 3 can be consumed. More preferably, a fuse portion is provided in the positive electrode current collector 6 or the positive electrode external conductor member 8 such that the short circuit current causes the fuse portion to melt to thereby break the conductive path.

By forming the sealing plate 2 by press working, the deformable member 19 can be formed integrally with the sealing plate 2. When the deformable member 19 attached to the sealing plate 2 is formed separately from the sealing plate 2, it is preferable that the deformable member 19 is connected by welding to the outer surface side of the sealing plate 2. The deformable member 19 is preferably made of the same metal as the sealing plate 2 and more preferably made of aluminum or an aluminum alloy. The shape of the deformable member 19 is not limited to a specific shape, so long as the deformable member 19 deforms when the pressure inside the battery case 40 reaches a prescribed value or higher and is electrically connected to the negative electrode external conductive member 11.

Figure 4:
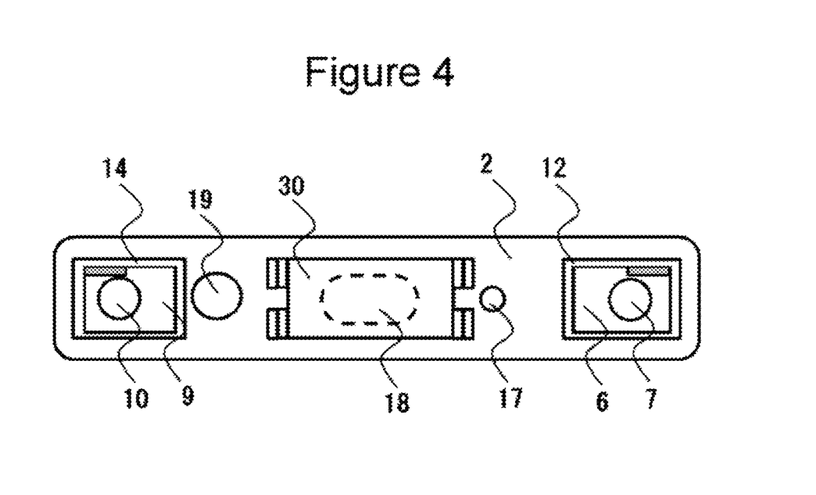
FIG. 4 is an illustration showing the inner surface side of a sealing plate with components attached thereto.

FIG. 4 is an illustration showing the inner surface side of the sealing plate 2 (the inner side of the battery) with components attached thereto. In FIG. 4, the position of the gas release valve 18 is indicated by a broken line. As shown in FIG. 4, a metallic reinforcing member 30 is connected to the inner surface of the sealing plate 2. Preferably, the reinforcing member 30 is positioned so as to face the gas release valve 18. The reinforcing member 30 can be produced by bending a plate-shaped metal member.

Figure 5:
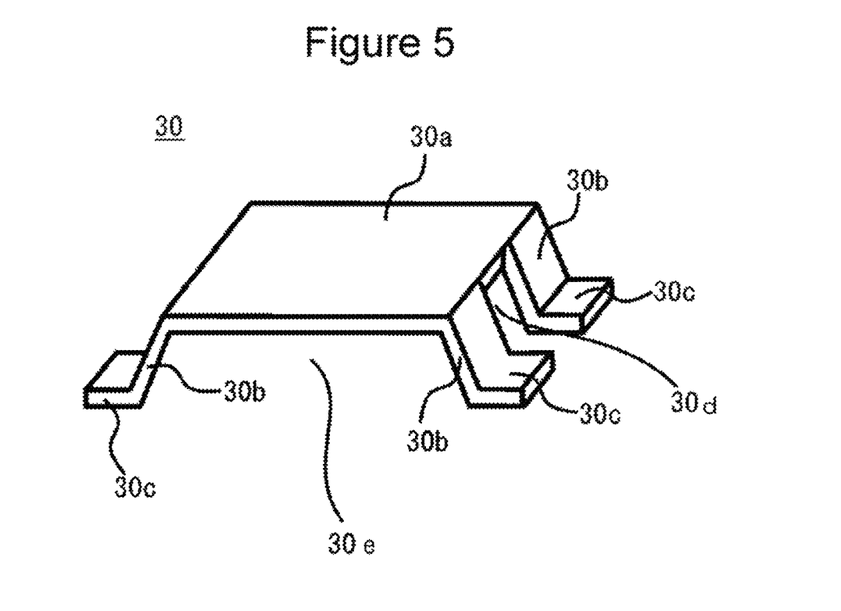
FIG. 5 is a perspective view showing a reinforcing member in the embodiment.

FIG. 5 is a perspective view of the reinforcing member 30. The upper side in FIG. 5 is the electrode assembly 3 side of the rectangular secondary battery 50, and the lower side is the sealing plate 2 side. The reinforcing member 30 includes a main body 30a disposed so as to face the gas release valve 18, leg portions 30b extending from the main body 30a toward the sealing plate 2, and connection portions 30c disposed at forward ends of the leg portions 30b. The connection portions 30c are connected by welding to the sealing plate 2. Four leg portions 30b are disposed at edges of the main body 30a. Openings are formed between adjacent leg portions 30b. A pair of first openings 30d are disposed so as to be opposed to each other in the lengthwise direction of the sealing plate 2, and a pair of second openings 30e are disposed so as to be opposed to each other in the widthwise direction of the sealing plate 2. The gas is discharged through the first openings 30d and the second openings 30e.

To further improve the reliability of the rectangular secondary battery 50, the gas release valve 18 is provided in the sealing plate 2, and the deformable member 19 included in the short circuit mechanism 25 is further provided. In this case, the strength of the sealing plate 2 may decrease. If the strength of the sealing plate 2 decreases, the sealing plate 2 may bend and deform as the pressure inside the battery case 40 increases. Alternatively, the expansion of the electrode assembly 3 may cause the exterior housing 1 to deform, and this deformation may cause the sealing plate 2 to deform. The deformation of the sealing plate 2 may cause a problem in that the operating pressure of the deformable member 19 or the gas release valve 18 is not stabilized.

However, in the rectangular secondary battery 50, the metallic reinforcing member 30 is attached to the inner surface side of the sealing plate 2. In this case, even when the gas release valve 18 is provided in the sealing plate 2 and the deformable member 19 is further provided, the deformation of the sealing plate 2 can be reduced. Therefore, the operating pressure of the gas release valve 18 and the operating pressure of the deformable member 19 are stabilized, and the secondary battery can be more reliable.

Preferably, a fifth insulating member 35 is disposed between the reinforcing member 30 and the electrode assembly 3. In the rectangular secondary battery 50, an insulating tape serving as the fifth insulating member 35 is applied to the electrode assembly 3 at a position facing the reinforcing member 30. Preferably, the electrode assembly 3 includes a plurality of wound electrode assemblies, and an insulating tape that binds the plurality of wound electrode assemblies together is used as the fifth insulating member 35.

Preferably, the connection portions 30c of the reinforcing member 30 are connected to the sealing plate 2 at positions around the gas release valve 18. Preferably, the gas release valve 18 is disposed so as to be surrounded by the connection portions 30c. In this case, the operating pressure of the gas release valve 18 can be stabilized more reliably.

Preferably, the connection portions 30c of the reinforcing member 30 are connected to the sealing plate 2 at positions between the deformable member 19 and the gas release valve 18 and between the gas release valve 18 and the liquid injection hole 16 in the lengthwise direction of the sealing plate 2. In this case, the deformation of the sealing plate 2 can be reduced more effectively.

A preferred structure will be described below.

Figure 6:
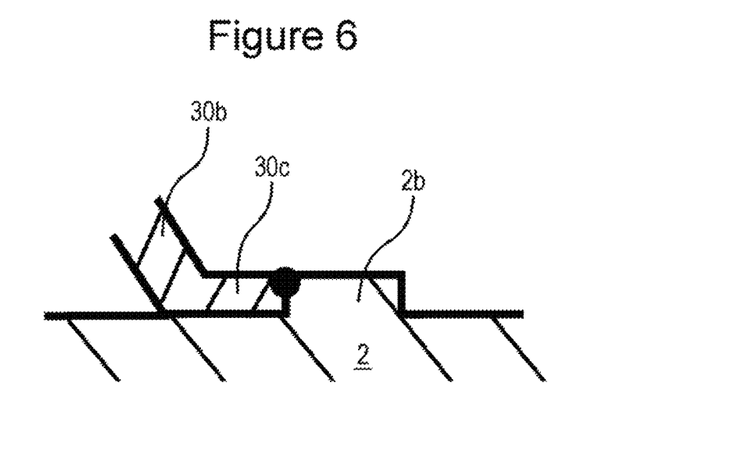
FIG. 6 is a cross-sectional view around a joint between the reinforcing member and the sealing plate, the cross-sectional view being taken in the lengthwise direction of the sealing plate.

FIG. 6 is a cross-sectional view around a joint between the sealing plate 2 and the sealing plate 2 of the reinforcing member 30, the cross-sectional view being taken in the lengthwise direction of the sealing plate 2. Preferably, a second protrusion 2b is formed on the sealing plate 2 such that an end of a connection portion 30c of the reinforcing member 30 is in contact with the second protrusion 2b as shown in FIG. 6, and the end of the connection portion 30c and the second protrusion 2b are connected to each other by, for example, laser welding. In this case, preferably, a plurality of second protrusions 2b are formed on the sealing plate 2, and the second protrusions 2b are connected by welding to the respective connection portions 30c. Preferably, the second protrusions 2b are disposed at ends of the respective connection portions 30c that are on the side opposite to the leg portions 30b. With this structure, the deformation of the sealing plate 2 can be reduced more effectively.

Recesses may be formed in the sealing plate 2, and the connection portions 30c of the reinforcing member 30 may be fitted into the recesses. In this case, preferably, the connection portions 30c of the reinforcing member 30 are welded to edges of the recesses to thereby connect the reinforcing member 30 to the sealing plate 2. With this structure, the strength of the sealing plate 2 can be more effectively improved.

Figure 7:
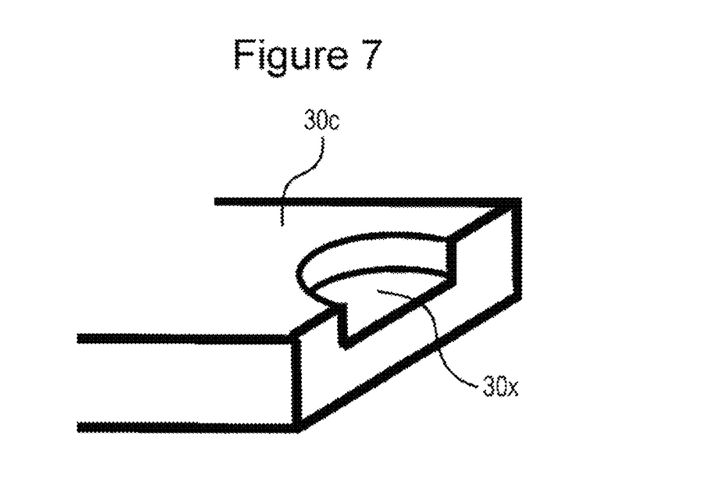
FIG. 7 is an enlarged perspective view around a connection portion of the reinforcing member in a modification.

FIG. 7 is an enlarged perspective view around a connection portion 30c of the reinforcing member 30 in a modification. As shown in FIG. 7, a thin-walled portion 30x is formed in part of a connection portion 30c, and this thin portion 30x can be connected by welding to the sealing plate 2. In this case, the reinforcing member 30 can be connected by welding to the sealing plate 2 using relatively small energy, so that a load during welding is prevented from being applied to the gas release valve 18.

Figure 8:
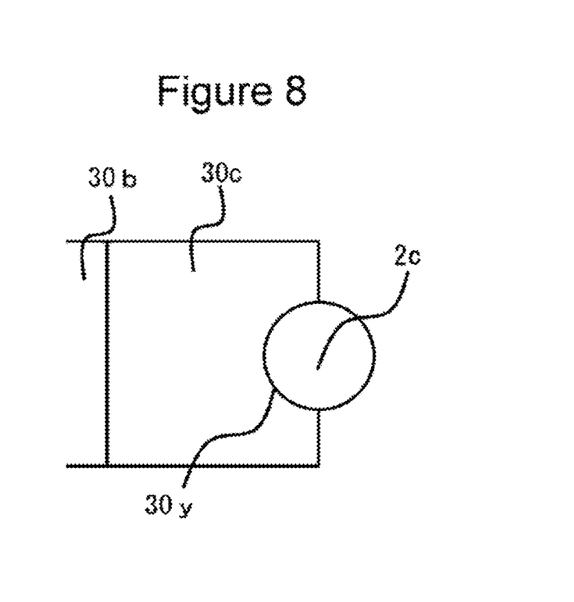
FIG. 8 is an enlarged view around a joint between the reinforcing member and the sealing plate in the modification.

FIG. 8 is an enlarged plan view around the joint between the sealing plate 2 and a connection portion 30c of the reinforcing member 30 in the modification. As shown in FIG. 8, a third protrusion 2c is formed on the sealing plate 2, and a notch 30y is formed in the connection portion 30c. The third protrusion 2c is fitted to the notch 30y. Then the third protrusion 2c is connected by, for example, laser welding to the edge of the notch 30y. With this structure, the deformation of the sealing plate 2 can be reduced more effectively. The third protrusion 2c is not limited to the circular cylindrical protrusion and may be a prism-shaped protrusion or a protrusion having another shape.

Figure 9:
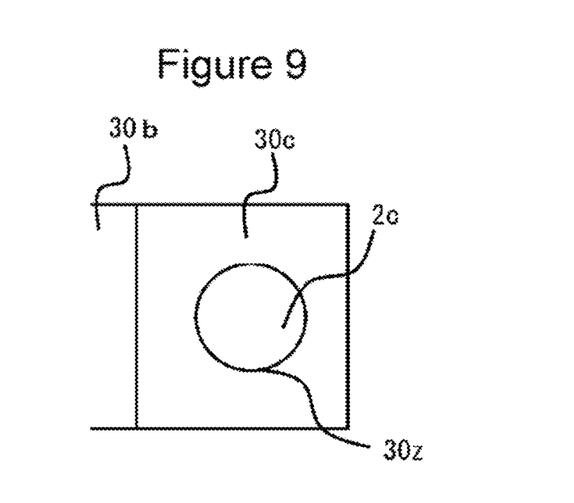
FIG. 9 is an enlarged view around a joint between the reinforcing member and the sealing plate in another modification.

FIG. 9 is an enlarged plan view around the joint between the sealing plate 2 and a connection portion 30c of the reinforcing member 30 in another modification. As shown in FIG. 9, a third protrusion 2c is formed on the sealing plate 2, and a connection opening 30z is formed in the connection portions 30c. The third protrusion 2c is fitted to the connection opening 30z. Then the third protrusion 2c can be connected by, for example, laser welding to the edge of the connection opening 30z. With this structure, the deformation of the sealing plate 2 can be reduced more effectively.

Figure 10:
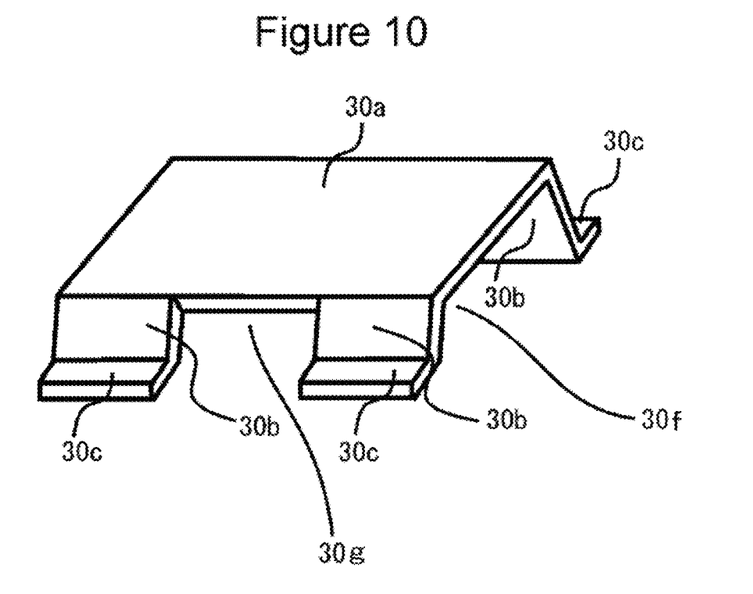
FIG. 10 is a perspective view of the reinforcing member in a modification.

FIG. 10 is a perspective view of the reinforcing member 30 in a modification. In the reinforcing member 30 shown in FIG. 5, the leg portions 30b are disposed at opposite edges, with respect to the lengthwise direction of the sealing plate 2, of the main body 30a. However, in the reinforcing member 30 in this modification, the leg portions 30b are disposed at opposite edges, with respect to the widthwise direction of the sealing plate 2, of the main body 30a. In this structure, when the gas release valve 18 breaks, the gas in the exterior housing 1 can be discharged to the outside of the battery more smoothly. When the reinforcing member 30 shown in FIG. 10 is used, a pair of third openings 30f are disposed so as to be opposed to each other in the lengthwise direction of the sealing plate 2, and a pair of fourth openings 30g are disposed so as to be opposed to each other in the widthwise direction of the sealing plate 2.

Figure 11:
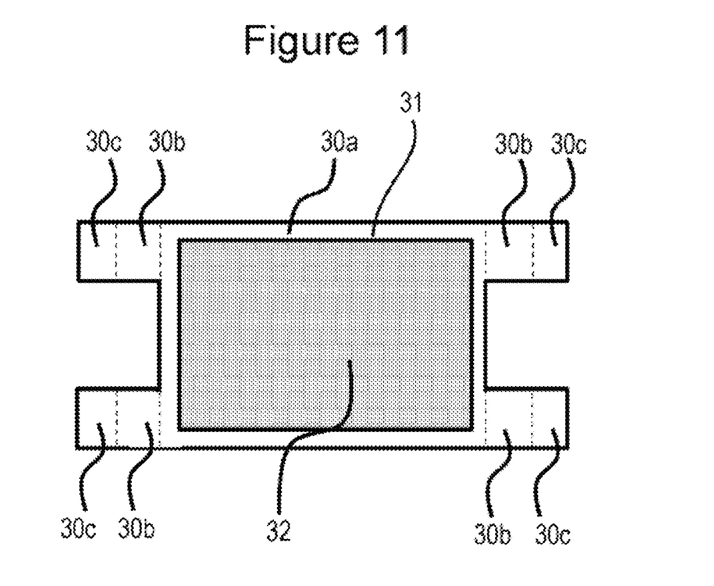
FIG. 11 shows a development of the reinforcing member in a modification.
Figure 12:
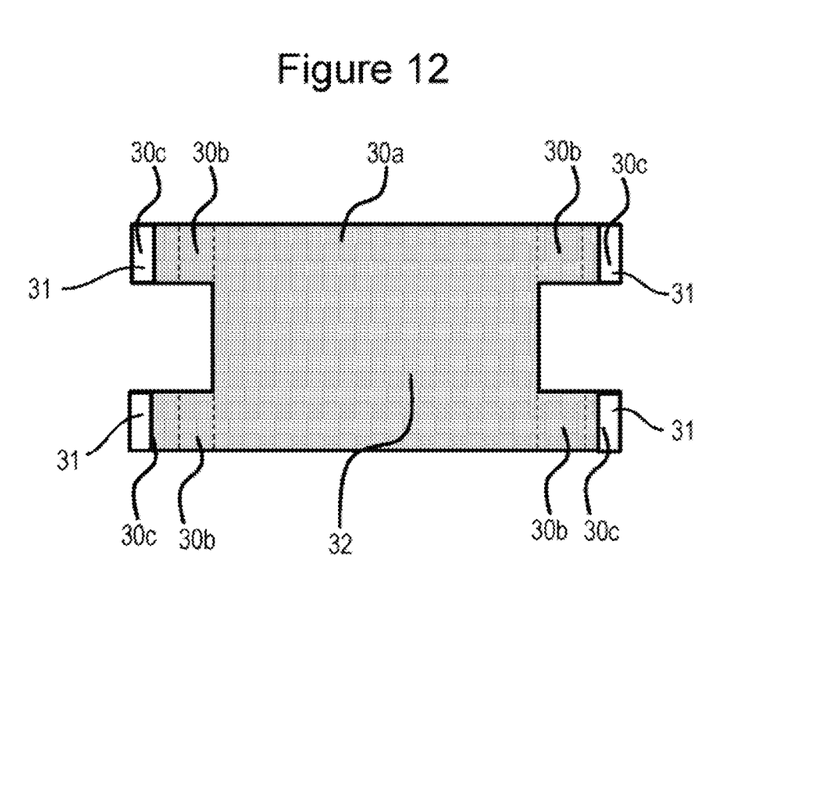
FIG. 12 shows a development of the reinforcing member in another modification.

FIGS. 11 and 12 are developments of reinforcing members 30 in modifications. Positions indicated by broken lines are boundaries between the main body 30a and the leg portions 30b and boundaries between the leg portions 30b and the connection portions 30c. In the above embodiment, the reinforcing member 30 used is made of aluminum or an aluminum alloy. However, each of the reinforcing members 30 in these modifications includes portions made of different metals.

As shown in FIG. 11, in the reinforcing member 30 in one of these modifications, a second metallic portion 32 made of a second metal having a higher Young's modulus than aluminum and an aluminum alloy is stacked on a first metallic portion 31 made of aluminum or an aluminum alloy used as a first metal. In this case, the deformation of the sealing plate 2 can be reduced more effectively. The second metallic portion 32 is disposed on the main body 30a composed of the first metallic portion 31. More preferably, the melting point of the second metal is higher than the melting point of the first metal. In this case, even when the temperature of the rectangular secondary battery 50 increases, the deformation of the sealing plate 2 can be prevented more effectively.

The first metal is preferably aluminum or an aluminum alloy. The second metal is preferably copper, a copper alloy, iron, an iron alloy, nickel, a nickel alloy, etc. No particular limitation is imposed on the method for connecting the first metallic portion 31 to the second metallic portion 32. The second metallic portion 32 may be connected by welding to the reinforcing member 30 made of the first metal. They may be connected to each other by, for example, crimping. For example, they may be connected to each other by forming a protrusion on the first metallic portion 31 made of the first metal, inserting the protrusion into an opening or a notch in the second metallic portion 32, and then expanding the diameter of the forward end of the protrusion. Alternatively, a clad material including the first metal and the second metal may be used. In this case, the clad material is subjected to bending to form the reinforcing member 30.

The reinforcing member 30 may be made of copper, a copper alloy, iron, an iron alloy, nickel, a nickel alloy, etc. When the second metal is copper or a copper alloy, it is preferable that the second metallic portion 32 is not exposed at the outer surface of the reinforcing member 30. For example, it is preferable that, in the reinforcing member 30 used, a member made of copper or a copper alloy is contained inside the reinforcing member 30 made of aluminum or an aluminum alloy.

It is preferable that the second metallic portion 32 is disposed not only on the main body 30a but also on the leg portions 30b, as shown in FIG. 12. It is also preferable that the second metallic portion 32 is disposed also on the connection portions 30c, as shown in FIG. 12. However, as shown in FIG. 12, it is preferable that, in at least part of the connection portions 30c, the first metallic portion 31 made of the same metal as the sealing plate 2 is exposed.

Figure 13:
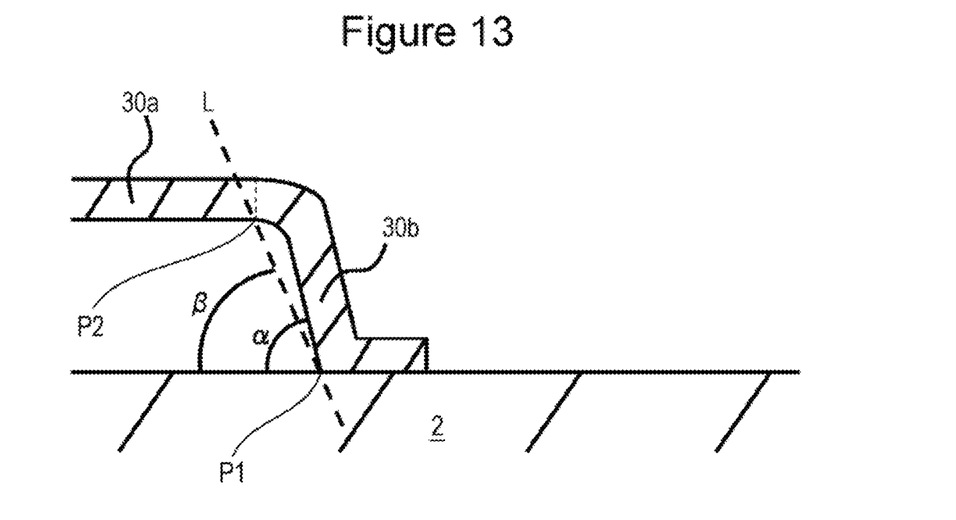
FIG. 13 is a cross-sectional view around a joint between the reinforcing member and the sealing plate, the cross-sectional view being taken in the lengthwise direction of the sealing plate.

FIG. 13 is a cross-sectional view around a joint between the reinforcing member 30 and the sealing plate 2, the cross-sectional view being taken in the lengthwise direction of the sealing plate 2. In FIG. 13, the upper side is the side toward the electrode assembly 3, and the lower side is the side toward the sealing plate 2. When the sealing plate 2 and the reinforcing member 30 are viewed in a direction parallel to the inner surface of the sealing plate 2 and extending in the widthwise direction of the sealing plate 2, it is preferable that $\alpha > \beta$ holds, as shown in FIG. 13. Here, $\alpha$ (°) is the angle between a leg portion 30b of the reinforcing member 30 and the inner surface of the sealing plate 2, and $\beta$ (°) is the angle between the inner surface of the sealing plate 2 and a straight line L that connects P1 to P1. Here, P1 is an end of the joint between the reinforcing member 30 and the sealing plate 2, which end is located on the side toward the main body 30a. P2 is an end of the boundary between the main body 30a of the reinforcing member 30 and the leg portion 30b, which end is located on the side toward the sealing plate 2. In this case, the deformation of the sealing plate 2 can be reduced more effectively.

Figure 14:
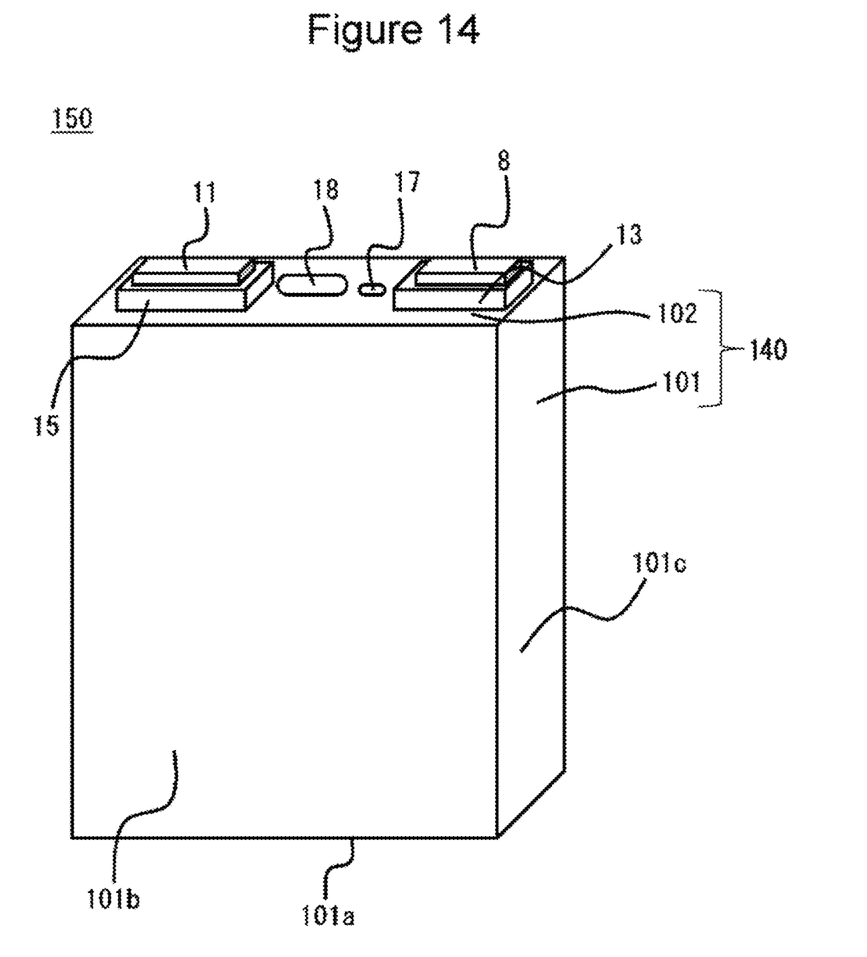
FIG. 14 is a perspective view of a rectangular secondary battery in a modification.
Figure 15:
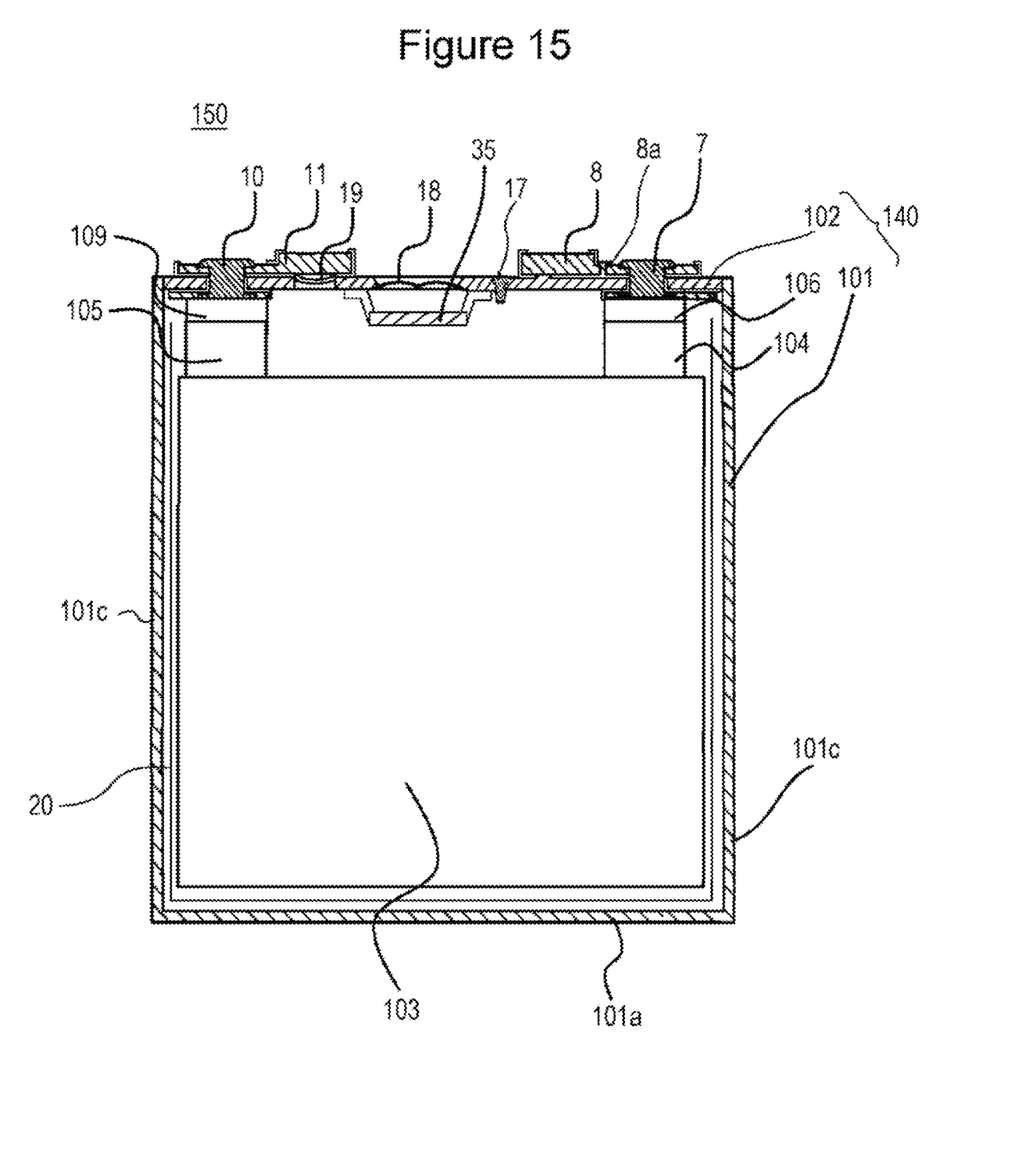
FIG. 15 is a cross-sectional view of the rectangular secondary battery in the modification.

FIG. 14 is a perspective view of a rectangular secondary battery 150 in a modification. FIG. 15 is a cross-sectional view of the rectangular secondary battery 150. Differences between the rectangular secondary battery 150 in this modification and the rectangular secondary battery 50 described above will be described below. Portions that will not be described have substantially the same structures as those in the rectangular secondary battery 50.

As shown in FIGS. 14 and 15, a battery case 140 includes: an exterior housing 101 that has an opening and houses an electrode assembly 103; and a sealing plate 102 that seals the opening of the exterior housing 101. The exterior housing 101 has a bottom 101a, a pair of first side walls 101b, and a pair of second side walls 101c. The area of each second side wall 101c is smaller than the area of each first side wall 101b. The opening of the exterior housing 101 is disposed at a position opposed to the bottom 101a. The area of the opening of the exterior housing 101 sealed with the sealing plate 102 is smaller than the area of each second side wall 101c.

In this structure, the sealing plate 102 can have the same area as the smallest one of the six main outer surfaces of the battery case 140. This is more preferable because, even when the pressure inside the battery case 140 increases, the sealing plate does not easily deform.

As shown in FIG. 15, a positive electrode core-exposed portion 104 and a negative electrode core-exposed portion 105 are disposed at an edge of the electrode assembly 103 on the side toward the sealing plate 102. The positive electrode core-exposed portion 104 is electrically connected to a positive electrode terminal 7 and a positive electrode external conductive member 8 through a positive electrode current collector 106. The negative electrode core-exposed portion 105 is electrically connected to a negative electrode terminal 10 and a negative electrode external conductive member 11 through a negative electrode current collector 109. The positive electrode core-exposed portion 104 including a stack of a plurality of layers protrudes from the electrode assembly 103, and the negative electrode core-exposed portion 105 including a stack of a plurality of layers protrudes from the electrode assembly 103.

In this case, it is preferable that the electrode assembly 103 is a wound electrode assembly and is housed in the exterior housing 101 such that the winding axis of the wound electrode assembly is perpendicular to the sealing plate 102. In the wound electrode assembly 103, the central portion of the electrode assembly 103 tends to expand after repeated charging and discharging cycles. When the central portion of the electrode assembly 103 expands, the exterior housing 101 is pressed outward by the electrode assembly 103 and is thereby deformed. The deformation of the exterior housing 101 may cause the sealing plate 102 to deform.

In the above structure, the sealing plate 102 can be easily disposed at a position spaced apart from the central portion of the electrode assembly 103, so that the deformation of the sealing plate 102 caused by the deformation of the exterior housing 101 can be reduced effectively. Preferably, the electrode assembly 103 disposed in the battery case 140 includes a plurality of wound electrode assemblies. The use of the plurality of wound electrode assemblies is more advantageous in reducing the deformation of the battery case 140 than the use of one large wound electrode assembly.

In the rectangular secondary battery 150, the sealing plate 102 has the same area as the smallest one of the six main outer surfaces of the battery case 140. In this case, it is preferable that the reinforcing member 30 has the shape shown in FIG. 10. This allows the length of the reinforcing member 30 in the lengthwise direction of the sealing plate 102 to be reduced. Therefore, the reinforcing member 30 is prevented from interfering with other components.

In the rectangular secondary battery 150, the sealing plate 102 has the same area as the smallest one of the six main outer surfaces of the battery case 140. In this case, when the reinforcing member 30 has the shape shown in FIG. 5, it is preferable that the liquid injection hole 16 is located between two connection portions 30c. This can reduce the deformation of the sealing plate 102 more effectively.

<Others>

In the above embodiment, the short circuit mechanism has the structure in which the deformable member 19 is electrically connected to the positive electrode plate, but this is not a limitation. It is only necessary that the deformable member 19 be formed in the sealing plate 2. For example, the sealing plate 2 and the deformable member 19 may not be electrically connected to the positive electrode plate and the negative electrode plate during normal use of the secondary battery. However, in this structure, the sealing plate 2 and the deformable member 19 are electrically connected to one of the electrode plates when the deformable member 19 is activated. For example, two deformable members may be disposed in the sealing plate 2. The positive electrode external conductive member is disposed above one of the deformable members, and the negative electrode external conductive member is disposed above the other deformable member. In this case, when one of the deformable members deforms and is electrically connected to the positive electrode external conductive member and the other deformable member deforms and is electrically connected to the negative electrode external conductive member, the positive electrode plate and the negative electrode plate are electrically short-circuited.

No particular limitation is imposed on the type of the rectangular secondary battery 50 in the present invention. No particular limitation is imposed on the structure of the electrode assembly 3. The electrode assembly 3 may be a wound electrode assembly prepared by winging a long positive electrode plate and a long negative electrode plate through a separator. The electrode assembly 3 may be a stacked electrode assembly prepared by stacking a plurality of positive electrode plates and a plurality of negative electrode plates through separators.

The present invention is particularly effective when applied to a non-aqueous electrolyte secondary battery. Known materials can be used for the positive electrode, the negative electrode, the separator, the electrolytic solution, etc. It is particularly preferable that a material that generates a gas when the rectangular secondary battery 50 is overcharged is added to the positive electrode plate or the electrolytic solution. For example, lithium carbonate may be added to the positive electrode active material layer. Cyclohexylbenzene, for example, may be added to the electrolytic solution.

In the examples shown in the above embodiment, the gas release valve 18 is disposed integrally with the sealing plate 2. However, a gas release valve 18 prepared separately from the sealing plate 2 may be connected by welding to the sealing plate 2 so as to cover a through hole formed in the sealing plate 2. When both the deformable member 19 and the gas release valve 18 are connected by welding to the sealing plate 2, it is preferable that the deformable member 19 is welded to the outer surface side of the sealing plate 2 and the gas release valve 18 is welded to the inner surface side of the sealing plate 2.

REFERENCE SIGNS LIST 50 rectangular secondary battery
40 battery case
1 exterior housing
2 sealing plate
  2a first protrusion
  2b second protrusion
  2c third protrusion
  2x through hole
3 electrode assembly
4 positive electrode core-exposed portion
5 negative electrode core-exposed portion
6 positive electrode current collector
7 positive electrode terminal
8 positive electrode external conductive member
  8a fuse portion
9 negative electrode current collector
10 negative electrode terminal
11 negative electrode external conductive member
12 first insulating member
13 second insulating member
14 third insulating member
15 fourth insulating member
16 liquid injection hole
17 sealing member
18 gas release valve
19 deformable member
20 insulating sheet
21 gasket
22 gasket
25 short circuit mechanism
30 reinforcing member
  30a main body
  30b leg portion
  30c connection portion
  30d first opening
  30e second opening
  30x thin-walled portion
  30y notch
  30z connection opening
30f third opening
30g fourth opening
31 first metallic portion
32 second metallic portion
35 fifth insulating member
101 exterior housing
  101a bottom
  101b first side wall
  101c second side wall 102 sealing plate
103 electrode assembly
104 positive electrode core-exposed portion
105 negative electrode core-exposed portion
106 positive electrode current collector
109 negative electrode current collector
140 battery case
150 rectangular secondary battery

The invention claimed is:

1. A secondary battery comprising:
an electrode assembly including a positive electrode plate and a negative electrode plate; an exterior housing that has an opening and houses the electrode assembly; and a sealing plate that seals the opening,
wherein the exterior housing and the sealing plate form a battery case,
wherein a deformable member that deforms when the pressure inside the battery case reaches a prescribed value or higher and a gas release valve that breaks when the pressure inside the batter/ease reaches a prescribed value or higher to release gas inside the battery ease to the outside of the battery case are provided in the sealing plate,
wherein the deformable member and the gas release valve are spaced apart from each other in a lengthwise direction of the sealing plate, and
wherein the pressure at which the gas release valve breaks is set to be higher than the pressure at which the deformable member deforms,
wherein a metallic reinforcing member is connected to an inner surface of the sealing plate, and
wherein the reinforcing member is positioned so as to face the gas release valve,
a short circuit mechanism that causes the positive electrode plate and the negative electrode plate to be short-circuited with each other when the deformable member deforms,
wherein the reinforcing member includes a main body disposed so as to face the gas release valve, a plurality of leg portions extending from the main body toward the sealing plate, and connection portions each located on a sealing plate side of a corresponding one of the leg portions, and
wherein the connection portions are connected to the sealing plate
wherein, when the sealing plate and the reinforcing member are viewed in a direction parallel to the inner surface of the sealing plate and extending in a widthwise direction of the sealing plate,
a>b holds,
where a is the angle between one of the leg portions of the reinforcing member and the inner surface of the sealing plate, and
b is the angle between the inner surface of the sealing date and a straight line L that connects a contact point between the reinforcing member and the sealing plate and a boundary between the main body and the one of die leg portions.

2. The secondary battery according to claim 1,
wherein an external conductive member electrically connected to the negative electrode plate is disposed outward of the deformable member, and
wherein, when the deformable member deforms, the deformable member is electrically connected to the external conductive member.

3. The secondary battery according to claim 1,
wherein the reinforcing member includes a portion made of a first metal of the same type as a metal forming the sealing plate and a portion made of a second metal having a higher Young's modulus than the first metal.

4. The secondary battery according to claim 3,
wherein the first metal is aluminum or an aluminum alloy, and
wherein the second metal is, copper, a copper alloy, iron, an iron alloy, nickel, or a nickel alloy.

5. The secondary battery according to claim 1,
wherein the sealing plate has a through hole, and the deformable member is connected by welding to an outer surface side of the sealing plate so as to cover the through hole, and
wherein the gas release valve is formed integrally with the sealing plate.

6. The secondary battery according to claim 1,
wherein the exterior housing has a bottom, a pair of first side walls, and a pair of second side walls,
wherein the area of each of the second side walls is smaller than the area of each of the first side walls,
wherein the opening is disposed at a position opposed to the bottom, and
wherein the area of the opening is smaller than the area of each of the second side walls.

* * * * *